United States Patent [19]

Wulff

[11] Patent Number: 4,891,899
[45] Date of Patent: Jan. 9, 1990

[54] REEL SEAT

[76] Inventor: Lee Wulff, Beaverhill Rd., Lew Beach, N.Y. 12753

[21] Appl. No.: 208,746

[22] Filed: Jun. 17, 1988

[51] Int. Cl.⁴ ............................................. A01K 87/06
[52] U.S. Cl. ....................................................... 43/22
[58] Field of Search ............................... 43/20, 22, 23

[56] References Cited

U.S. PATENT DOCUMENTS

| 2,057,535 | 9/1936 | McKechnie | 43/22 |
| 2,069,977 | 2/1937 | Spencer | 43/22 |
| 2,114,107 | 4/1938 | Holding | 43/22 |
| 2,182,901 | 12/1939 | Moulton | 43/22 |
| 2,443,567 | 6/1948 | Moulton | 43/22 |
| 3,098,313 | 7/1963 | Pottz | 43/22 |
| 3,364,612 | 1/1968 | Holahan | 43/22 |
| 3,468,652 | 8/1969 | Hardesty | 43/23 |

FOREIGN PATENT DOCUMENTS 642843 6/1962 Canada ...................................... 43/22
248947 3/1926 United Kingdom ................... 43/22

Primary Examiner—Kurt Rowan
Attorney, Agent, or Firm—Handal & Morofsky

[57] ABSTRACT

This invention relates to a device for securing a fishing reel to a fishing rod. The rectangular foot of a fishing reel sits in flanges of sleeves positioned at either end of the rectangular foot. A threaded shaft passes through these sleeves and screws into a correspondingly threaded inside diameter of a fishing rod grip. A spacing tube is disposed between the sleeves to provide rigidity and enhance the appearance of the inventive system. The end of the threaded shaft opposite the threaded end is terminated by a knob. The knob urges the second sleeve towards the first sleeve as the threaded shaft is screwed into the fishing rod grip. The distance between the sleeves is decreased and the said rectangular foot is clamped between the sleeves. Thus the fishing reel is effectively clamped to the fishing rod.

18 Claims, 2 Drawing Sheets

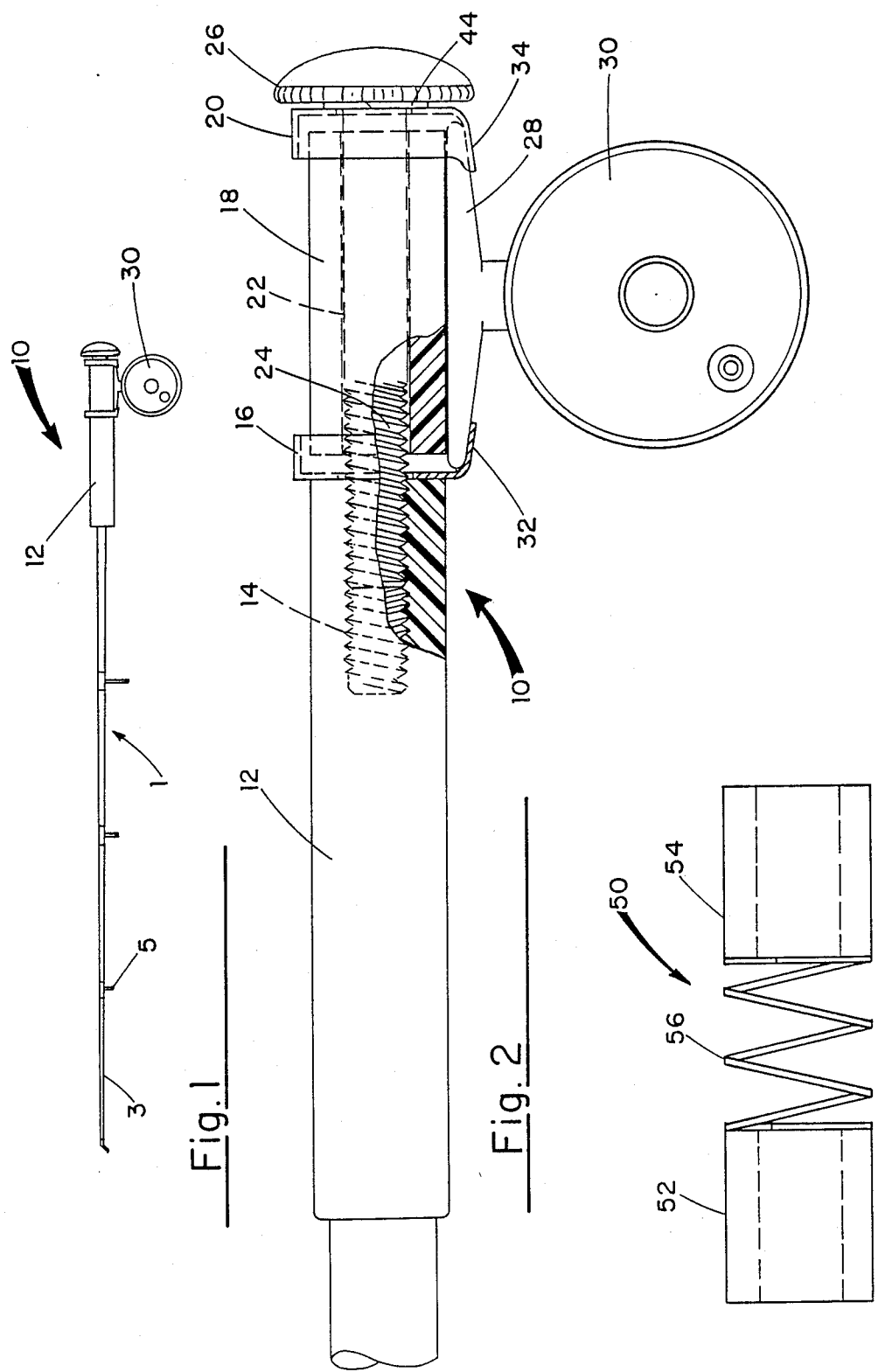

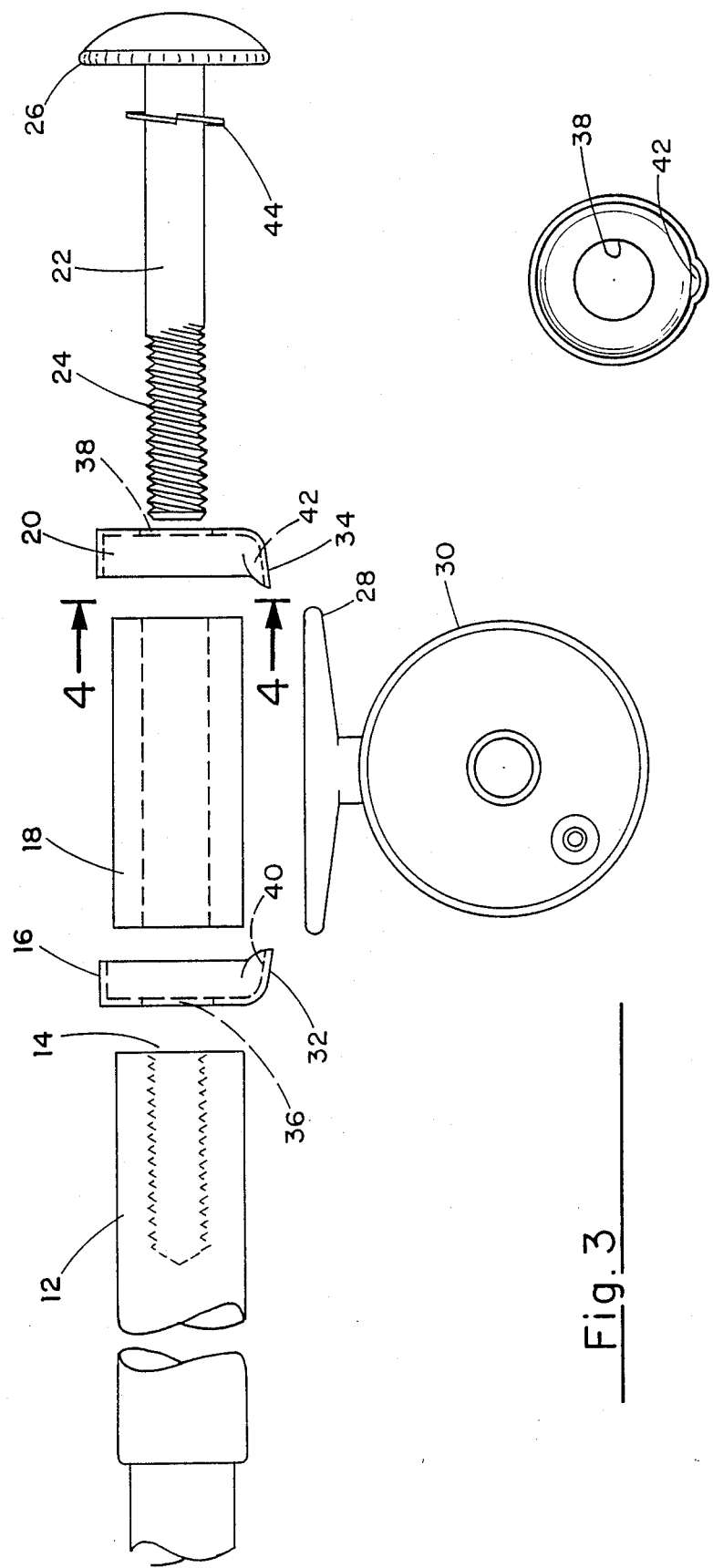

REEL SEAT

TECHNICAL FIELD

This invention relates to a fishing rod incorporating novel means for securing a fishing reel to a fishing rod without a cumbersome length of rod behind the reel.

BACKGROUND

Fishing reels generally include a double-ended, substantially rectangular foot by which the reel is clamped to the rod. Conventional means of clamping a reel to a rod make use of a stationary clamping sleeve mounted near the end of the fishing rod, and having a slot into which one end of the rectangular foot of the reel slips, and a slidable clamping sleeve with a slot into which the other end of the rectangular foot slips. The slidable sleeve is disposed around a portion of the rod and facing the stationary sleeve opposite its slot. This portion is threaded and the slidable sleeve is urged towards the stationary sleeve by rotating a nut matingly threaded with the threaded portion of the rod and located behind the slidable sleeve. Thus the conventional means are provided for securing a reel to rod by clamping the substantially rectangular foot of the reel within and between the stationary sleeve and the slidable sleeve with the reel held tightly by a nut on the threaded portion of the fishing rod.

A necessary result of this conventional method of securing a reel to a rod is an excess portion of the threaded shaft extending behind the reel, away from the rod tip, which adds weight and distance to the fishing rod. This excess portion of shaft detracts from the appearance of the rod and is a disadvantage when casting.

DISCLOSURE OF INVENTION

The invention, as claimed, is intended to provide a remedy. It solves the problem of how to secure a fishing reel to a fishing rod while maintaining a minimum of rod length at the end of the rod, thus overcoming disadvantages in casting and comfort.

Unlike conventional methods which utilize a slidable sleeve which is urged towards a stationary sleeve by the rotation of a nut on the threaded portion of the rod, the inventive device secures the reel to the rod in a new and advantageous manner. The inventive device has a stationary sleeve which can be permanently attached to the rod handle. A second or slidable sleeve is located on a shaft which has its forward portion threaded. This second sleeve is free to rotate angularly about the shaft. This shaft is terminated by a knob which bears upon and holds the second sleeve in position when in use. The rod handle is provided with an axial bore hole threaded to securely engage the threaded portion of the shaft The substantially rectangular foot of the reel is positioned between the stationary sleeve and the second sleeve and aligned with slots defined by these sleeves. The threaded portion of the shaft passes through the stationary sleeve and is screwed into the bore hole opening at the end of the rod handle. The knob bears against the second sleeve The rectangular foot, and thus the reel, is clamped between the stationary sleeve and second sleeve on the shaft and secured in position by the shaft. The shaft is screwed into the rod causing the knob to bear upon the second sleeve and provide the pressure necessary to securely clamp the reel in position. The rod handle thus extends behind the second sleeve only the thickness of the knob.

BRIEF DESCRIPTION OF THE DRAWINGS

One way of carrying out the invention is described in detail below with reference to drawings which illustrate only one specific embodiment of the invention and in which:

FIG. 1 is a view of fly fishing rod and reel incorporating the invention;

FIG. 2 is a view of the inventive device;

FIG. 3 is an exploded view of the inventive device showing its component parts;

FIG. 4 is a view along line 4—4 of FIG. 3 illustrating a sleeve in accordance with the present invention; and FIG. 5 is a plan view of an adjustable member useful in the present invention to accommodate reels of differing size.

DETAILED DESCRIPTION OF THE DRAWINGS

As illustrated in FIG. 1, a rod 1 comprises a mast 3, eyes 5 and a reel seat 10. Referring to FIG. 2, the rod incorporating the inventive reel seat 10 comprises a rod grip 12 incorporating a threaded axial bore hole 14. A stationary sleeve 16 abuts the end of rod grip 12. Rod grip 12 has a threaded, axial bore hole 14. A spacing tube 18, positioned between stationary sleeve 16 and a fixed second sleeve 20,, maintains rigidity, protects the threaded sleeve from the elements, and enhances the appearance of the system when in operation.

A threaded shaft 22 is terminated on the exposed end, outside the threaded bore hole, by a knob 26. This knob provides the mechanical advantage necessary to securely screw the threaded shaft 22 into the threaded bore hole 14. As the threaded shaft 22 is screwed into the threaded bore hole 14 the knob 26 bears against the second sleeve 20 pushing the second sleeve towards the stationary sleeve 16 and thus the length between stationary sleeve 16 and second sleeve 20 is decreased. Foot 28 of reel 30 slips into stationary sleeve flange 32 and second sleeve flange 34. Threaded shaft 22, with its forward portion threaded as indicated by shaft threads 24, goes through second sleeve 20, a spacing tube 18 and stationary sleeve 16 and screws into the threaded bore hole 14. The rectangular foot 28 of the reel 30 is in this manner securely clamped between stationary sleeve 16 and the second sleeve 20 and thus reel 30 is clamped to the rod. Rectangular foot 28 is advantageously matched in length to the length of tube 18.

FIG. 3 is an exploded view of the components of one embodiment of the inventive device. The rod grip 12 has a threaded axial bore hole 14. The stationary sleeve 16 is positioned so as to abut rod grip 12. The stationary sleeve can either be permanently attached to the rod grip or can be held in place by the clamping force of the operational system. The spacing tube 18 provides rigidity to the inventive system. Both the stationary sleeve 16 and the second sleeve 20 are flanged as indicated respectively by stationary sleeve flange 32 and second sleeve flange 34. Sleeves 16 and 20 are maintained in position by resting on shaft 22 which passe through holes 36 and 38, respectively. See FIG. 4. The rectangular foot 28 of the reel 30 sits upon these flanges within the associated slots 40 and 42. The threaded shaft 22 has its forward portion partially threaded as indicated by shaft threads 24. The other end of the threaded shaft 22 is terminated by a knob 26. The threaded shaft 22 passes through the second sleeve 20, the spacing tube 18 and the stationary sleeve 16 and screws into the threaded bore hole 14. The inventive device is operated by rotating the knurled knob 26 causing the threaded portion of the threaded shaft 22 to engage the threading in the bore hole 14. The knob 26 bears upon the second sleeve 20 pushing said second sleeve towards the stationary sleeve 16 securing the rectangular foot 28, and thus the reel 30, to the rod. Lock washer 44, engaged between the knurled knob 26 and the second sleeve 20, prevents loosening or unscrewing while the rod and reel are in use. From the above description it will be appreciated that the inventive device provides a unique and advantageous method of attaching a fishing reel to a fishing rod utilizing a minimum of space.

As an alternative to selecting a tube 18 matched in length to the fishing reel, a spring loaded adjustable length tube 50 comprising first and second tube sections 52 and 54 joined by a spring 56 may be employed as shown in FIG. 5. While an illustrative embodiment of the invention has been described, it is of course understood that various modifications will be obvious to those of ordinary skill in the art. Such changes and modifications are within the scope of the invention which is limited and defined only be the appended claims.

I claim:

1. An apparatus to secure a fishing reel to a rod comprising:
   (a) a handle associated with said rod provided at one end with an axial bore hole;
   (b) a shaft dimensioned and configured at one end to engagingly fit within said bore hole;
   (c) a first bracket, shaped and dimensioned to abut said handle proximate said bore, said first bracket defining a first central opening to allow said shaft to pass through said bracket into said bore hole and said first bracket defining a first catching surface to engage a first mounting foot associated with said fishing reel;
   (d) a second bracket, shaped and dimensioned to define a second central opening to allow said shaft to pass through and to define a second catching surface to engage a second mounting foot associated with said fishing reel;
   (e) a member associated with the end of said shaft opposite said one end of said shaft dimensioned larger than said second central opening of said second bracket; and
   (f) a tube configured and dimensioned to be positioned wholly between said first and second brackets allowing said shaft to pass through its interior.

2. An apparatus as in claim 1, wherein said tube is adjustable in length.

3. An apparatus as in claim 2, wherein said adjustable tube comprises a spring-loaded mechanism for adjustment.

4. An apparatus as in claim 1, wherein said axial bore hole and said shaft ar matingly threaded.

5. An apparatus as in claim 4, wherein said shaft is only partially threaded.

6. An apparatus as in claim 1, wherein said member associated with said shaft is a knob.

7. An apparatus as in claim 1, wherein said first and second brackets are identically shaped.

8. An apparatus as in claim 7, wherein both of said brackets contain an opening and a flange designed to engage said mounting foot of said reel.

9. A fishing rod as in claim 1, wherein said first sleeve is secured to said handle.

10. A fishing rod as in claim 1, wherein a lock washer is positioned between the member associated with the end of said shaft and said second bracket.

11. A fishing rod adapted to be attached to a reel to comprising:
    (a) a rod mast;
    (b) a plurality of eyes on said mast;
    (c) a handle secured to said mast and provided with an axial threaded bore hole;
    (d) a threaded shaft having an end positioned in said bore hole and dimensioned and configured to engage said threaded bore hole;
    (e) a first sleeve abutting said handle, provided with a central opening, said threaded shaft passing through said central opening and provided with a flange configured to engage a mounting foot of said reel;
    (f) a second sleeve provided with a central opening through which said threaded shaft passes and positioned in facing spaced relationship to said first sleeve;
    (g) a knob on the exposed end of said threaded shaft said knob bearing against said second sleeve;
    (h) a tube positioned wholly between said first and second sleeves through which said threaded shaft passes, whereby rotation of said threaded shaft results in urging said sleeves toward each other; and
    (i) a lock washer postitioned between said knob on the exposed end of said threaded shaft and said second sleeve.

12. An apparatus as in claim 11, wherein said tube is adjustable in length.

13. An apparatus as in claim 12, wherein said adjustable tube comprises a spring-loaded mechanism for adjustment.

14. A fishing rod as in claim 11, wherein said first bracket is secured to said handle.

15. A fishing rod, comprising:
    (a) a rod mast;
    (b) a plurality of eyes on said mast;
    (c) a handle secured to said mast and provided with an axial threaded bore hole;
    (d) a threaded shaft having an end positioned in said bore hole and dimensioned and configured to engage said threaded bore hole;
    (e) a first sleeve abutting said handle, provided with a central opening, said threaded shaft passing through said central opening and provided with a flange configured to engage a mounting foot of said reel;
    (f) a second sleeve provided with a central opening through which said threaded shaft passes and positioned in facing spaced relationship to said first sleeve;
    (g) a reel positioned between said first and second sleeves;
    (h) a knob on the exposed end of said threaded shaft said knob bearing against said second sleeve; and
    (i) a tube positioned wholly between said first and second sleeves through which said threaded shaft passes, whereby rotation of said threaded shaft results in urging said sleeves toward each other.

16. A fishing rod as in claim 15, wherein said tube is adjustable in length.

17. A fishing rod as in claim 16, wherein said adjustable tube comprises a spring-loaded mechanism for adjustment.

18. A fishing rod as in claim 15, wherein said first sleeve is secured to said handle.

* * * * *